United States Patent
Shi et al.

(10) Patent No.: US 12,368,550 B2
(45) Date of Patent: Jul. 22, 2025

(54) INFORMATION CONFIGURATION METHOD AND APPARATUS, AND TERMINAL

(71) Applicant: GUANGDONG OPPO MOBILE TELECOMMUNICATIONS CORP., LTD., Dongguan (CN)

(72) Inventors: Zhihua Shi, Dongguan (CN); Zhi Zhang, Dongguan (CN); Wenhong Chen, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 403 days.

(21) Appl. No.: 17/536,858

(22) Filed: Nov. 29, 2021

(65) Prior Publication Data
US 2022/0085949 A1 Mar. 17, 2022

Related U.S. Application Data

(63) Continuation of application No. PCT/CN2019/098251, filed on Jul. 29, 2019.

(51) Int. Cl.
*H04L 5/00* (2006.01)
*H04W 24/10* (2009.01)

(52) U.S. Cl.
CPC .......... *H04L 5/0048* (2013.01); *H04W 24/10* (2013.01)

(58) Field of Classification Search
CPC ... H04L 5/0048; H04L 5/0023; H04L 5/0094; H04L 5/0053; H04W 24/10; H04W 8/24;
(Continued)

(56) References Cited

U.S. PATENT DOCUMENTS

2019/0356445 A1* 11/2019 Manolakos .......... H04B 7/0805
2022/0039028 A1* 2/2022 Wernersson ........ H04W 52/325
(Continued)

FOREIGN PATENT DOCUMENTS

| CN | 108075802 A | 5/2018 |
|---|---|---|
| CN | 108260217 A | 7/2018 |

(Continued)

OTHER PUBLICATIONS

3GPP TS 38.214 V15.6.0 (Jun. 2019) (Year: 2019).*
(Continued)

*Primary Examiner* — Mohammed S Chowdhury
(74) *Attorney, Agent, or Firm* — BAYES PLLC (57) ABSTRACT

The embodiments of the present application provide an information configuration method and apparatus, and a terminal. The method includes the following steps. A first terminal receives first configuration information. The first configuration information is used to determine at least one SRS resource set, each SRS resource set in the at least one SRS resource set comprises at least one SRS resource, and each SRS resource in the at least one SRS resource has N SRS ports. The first terminal supports XTYR type antenna switching, and a value of N satisfies a relationship as follows: N≤X; N, X, and Y are all positive integers. The first terminal sends an SRS signal based on the first configuration information.

15 Claims, 4 Drawing Sheets

Receive, by a first terminal, first configuration information, the first configuration information being used to determine at least one Sounding Reference Signal (SRS) resource set, each SRS resource set in the at least one one SRS resource set including at least one SRS resource, and each SRS resource in the at least one SRS resource having N SRS ports; the first terminal supporting XTYR type antenna switching, and a value of N satisfiing a relationship as follows: N≤X; N, X, and Y are all positive integers (58) Field of Classification Search
CPC . H04W 72/0453; H04W 72/23; H04W 88/02; H04B 7/0604; H04B 7/0628; H04B 7/0456; H04B 7/0404; H04B 7/04; Y02D 30/70
See application file for complete search history.

(56) References Cited

U.S. PATENT DOCUMENTS

| | | | |
|---|---|---|---|
| 2022/0166587 A1* | 5/2022 | Go | H04L 5/0048 |
| 2022/0201696 A1* | 6/2022 | Go | H04W 72/0446 |

FOREIGN PATENT DOCUMENTS

| | | |
|---|---|---|
| CN | 108768599 A | 11/2018 |
| CN | 109861734 A | 6/2019 |
| WO | 2019098788 A1 | 5/2019 |
| WO | 2019103560 A1 | 5/2019 |
| WO | 2019141285 A1 | 7/2019 |

OTHER PUBLICATIONS

3GPP TSG RAN WG1 Meeting #94bis; R1-1811808; Source: Sony; Title: Summary of SRS; Chengdu, China, Oct. 8-12, 2018 (Year: 2018).*
3GPP TSG RAN WG1 Meeting #94bis; R1-1811880; Source: Sony; Title: Summary of SRS; Chengdu, China, Oct. 8-12, 2018 (Year: 2018).*
3GPP TSG-RAN WG1 Meeting #93; Tdoc R1-1806227; Source: Ericsson; Title: Remaining issues on SRS; Busan, Korea, May 21-25, 2018. (Year: 2018).*
3GPP TSG RAN WG1 Meeting #93; R1-1805959; Source: Huawei, HiSilicon; Title: Remaining details of SRS design; Busan, Korea, May 21-25, 2018 (Year: 2018).*
International Search Report issued in corresponding International Application No. PCT/CN2019/098251, mailed Apr. 10, 2020, 38 pages.
Written Opinion of the International Searching Authority issued in corresponding International Application No. PCT/CN2019/098251, mailed Apr. 10, 2020, 9 pages.
"Summary of SRS", Agenda Item: 7.1.2.4, Source: Sony, 3GPP TSG RAN WG1 Meeting #94bis, R1-1811808, Chengdu, China, Oct. 8-12, 2018, 54 pages.
Extended European Search Report issued in corresponding European application No. 19939227.5, mailed May 30, 2022.
First Office Action issued in corresponding Indian application No. 202127061569, mailed Jun. 8, 2022.
"Summary of Rel15 SRS maintenance", Source: Sony, 3GPP TSG RAN WG1 Meeting #96, R1-1903325, Athens, Greece, Feb. 25-Mar. 1, 2019.
First Office Action issued in corresponding European application No. 19939227.5, mailed Feb. 13, 2023.
First Office Action issued in corresponding Japanese application No. 2021-578176, mailed Apr. 14, 2023.
Intel Corporation, "Remaining issues on reference signal and QCL", R1-1811647, 3GPP TSG RAN WG1 Meeting #94b Chengdu, China, Oct. 8-12, 2018.
Qualcomm Incorporated, "Maintenance for Multi-Antenna Scheme", R1-1811229, 3GPP TSG RAN WG1 Meeting #94bis Oct. 8-12, 2018 Chengdu, China.
Huawei et al., "Remaining details of SRS antenna switching", R1-1719821, 3GPP TSG RAN WG1 Meeting #91 Reno, USA, Nov. 27-Dec. 1, 2017.
Second Office Action issued in corresponding Japanese application No. 2021-578176, mailed Jul. 25, 2023.
Second Office Action issued in corresponding European application No. 19939227.5, mailed Aug. 14, 2023.
3GPP TSG RAN WG1 Meeting #93 Busan, Korea, May 21-25, 2018; R1-1805959; Source: Huawei, HiSilicon; Title: Remaining details of SRS design.
3GPP TS 38.214 V15.1.0 (Mar. 2018); Technical Specification Group Radio Access Network; NR; Physical layer procedures for data (Release 15).
First Office Action issued in corresponding Chinese application No. 202210158756.3, mailed Sep. 28, 2022.
Hearing Notice issued in corresponding Indian application No. 202127061569, mailed Feb. 29, 2024.
Request for the Submission of an Opinion issued in corresponding Korean Application No. 10-2021-7042988, mailed Oct. 28, 2024, 11 pages.

* cited by examiner

Receive, by a first terminal, first configuration information, the first configuration information being used to determine at least one Sounding Reference Signal (SRS) resource set, each SRS resource set in the at least one SRS resource set including at least one SRS resource, and each SRS resource in the at least one SRS resource having N SRS ports; the first terminal supporting XTYR type antenna switching, and a value of N satisfying a relationship as follows: N≤X; N, X, and Y are all positive integers

INFORMATION CONFIGURATION METHOD AND APPARATUS, AND TERMINAL

CROSS-REFERENCE TO RELATED APPLICATION

This application is a continuation of International Application No. PCT/CN2019/098251, filed on Jul. 29, 2019, the entire contents of which are hereby incorporated by reference.

TECHNICAL FIELD

Embodiments of the present disclosure generally relate to mobile communication technologies, and more particularly, to an information configuration method and device and a terminal.

BACKGROUND

In New Radio (NR), the network side can configure Sounding Reference Signal (SRS) resources for a terminal for antenna switching. The network side configures the SRS resources for the terminal based on the communication capability supported by the terminal, that is, an antenna switching type supported by the terminal. At present, SRS ports of the SRS resources configured by the network side for the terminal are not flexible enough, and for some terminals, all the transmitting channels supported by the terminal need to be put into use, which is not conducive to energy saving of the terminal.

SUMMARY

Embodiments of the present disclosure provide an information configuration method and device and a terminal.

An embodiment of the present disclosure provides an information configuration method, including receiving, by a first terminal, first configuration information. The first configuration information is used to determine at least one Sounding Reference Signal (SRS) resource set, each SRS resource set in the at least one SRS resource set includes at least one SRS resource, and each SRS resource in the at least one SRS resource has N SRS ports. The first terminal supports XTYR type antenna switching, and a value of N satisfies a relationship as follows: N≤X; N, X, and Y are all positive integers.

An embodiment of the present disclosure provides an information configuration device, including a receiving unit configured to receive first configuration information. The first configuration information is used to determine at least one SRS resource set, each SRS resource set in the at least one SRS resource set includes at least one SRS resource, and each SRS resource in the at least one SRS resource has N SRS ports. The first terminal supports XTYR type antenna switching, and a value of N satisfies a relationship as follows: N≤X; N, X, and Y are all positive integers.

An embodiment of the present disclosure provides a terminal including a processor and a memory configured to store a computer program. The processor is used to call and run the computer program stored in the memory to perform the above information configuration method.

An embodiment of the present disclosure provides a chip configured to perform the above information configuration method. Specifically, the chip includes a processor configured to call and run a computer program stored in a memory to cause a device in which the chip is installed to perform the above information configuration method.

An embodiment of the present disclosure provides a computer-readable storage medium configured to store a computer program. The computer program is configured to cause a computer to perform the above information configuration method.

An embodiment of the present disclosure provides a computer program product including computer program instructions that cause a computer to perform the above information configuration method.

An embodiment of the present disclosure provides a computer program configured to cause a computer to perform the above information configuration method.

In the above technical solutions, for the first terminal that supports XTYR (that is, the first terminal supports X transmitting channels and Y receiving channels) type antenna switching, the SRS resource configured by the network side has N SRS ports, N≤X. Thus, the first terminal can achieve fallback, such as falling back to NTYR, thereby reducing the power consumption of the first terminal and improving user experience.

BRIEF DESCRIPTION OF THE DRAWINGS

The drawings, which constitute a part of the present disclosure, are used to provide a further understanding of the present disclosure. The exemplary embodiments and descriptions of the present disclosure are used to explain the present disclosure and do not constitute any improper limitation on the present disclosure.

FIG. 2-1 is a first schematic diagram of an antenna according to an embodiment of the present disclosure.

FIG. 2-2 is a second schematic diagram of an antenna according to an embodiment of the present disclosure.

DETAILED DESCRIPTION

Technical solutions in embodiments of the present disclosure will be described below with reference to drawings. The described embodiments are a part of the embodiments of the present disclosure, not all of the embodiments of the present disclosure. Based on the embodiments described herein, all other embodiments obtained by those of ordinary skill in the art without creative work shall fall within the protection scope of the present disclosure.

Embodiments of the present disclosure can be applied to various communication systems, such as: a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, a LTE Frequency Division Duplex (FDD) system, a LTE Time Division Duplex (TDD), a Universal Mobile Telecommunication System (UMTS), a Worldwide Interoperability for Microwave Access (WiMAX) communication system or a 5G system, and so on.

Figure 1:
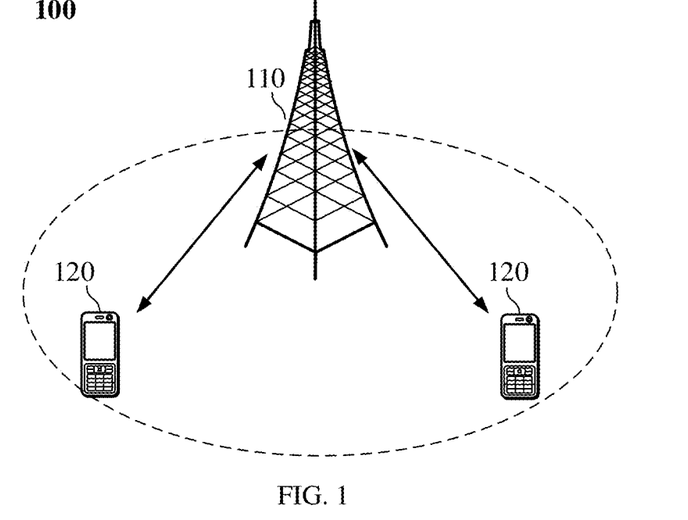
FIG. 1 is a schematic diagram of a communication system architecture according to an embodiment of the present disclosure.

As an example, the communication system 100 applied in embodiments of the present disclosure may be as shown in FIG. 1. The communication system 100 includes a network device 110, and the network device 110 may be a device that communicates with a terminal 120 (or called a communication terminal or a terminal device).

The network device 110 can provide communication coverage for a specific geographic area, and can communicate with terminals in the coverage area. According to embodiments, the network device 110 may be a base station (Base Transceiver Station, BTS) in a GSM system or a CDMA system, a base station (NodeB, NB) in a WCDMA system, an evolved base station (Evolutional Node B, eNB or eNodeB) in an LTE system, or a wireless controller in a Cloud Radio Access Network (CRAN), or the network device may be a mobile switching center, a relay station, an access point, an on-vehicle device, a wearable device, a hub, a switch, a network bridge, a router, a network side device in a 5G network, or a network device in a future evolved Public Land Mobile Network (PLMN), etc.

The communication system 100 further includes at least one terminal 120 within the coverage area of the network device 110. The "terminal" as used herein may be connected in the following manners (including but not limited to): the terminal device may be connected via wired lines, such as via Public Switched Telephone Networks (PSTN), Digital Subscriber Line (DSL), digital cables, and direct cable connections; and/or the terminal may be connected via another data connection/network; and/or the terminal may be connected via a wireless interface, such as cellular networks, wireless local area network (WLAN), digital TV networks such as DVB-H networks, satellite networks, AM-FM broadcast transmitter; and/or the terminal is connected via a device of another terminal which is configured to receive/send communication signals; and/or the terminal is connected via an Internet of Things (IoT) device.

A terminal set as communicating through a wireless interface may be referred to as a "wireless communication terminal", a "wireless terminal" or a "mobile terminal". Examples of the mobile terminal include but are not limited to: satellite or cellular phone; Personal Communications System (PCS) terminal that can integrate a cellular radio phone with data processing, fax, and data communication capabilities; a PDA which can include a radio phone, a pager, an Internet/intranet access, a Web browser, a memo pad, a calendar, and/or Global Positioning System (GPS) receiver; and conventional laptop and/or palmtop receivers or other electronic device including a radio telephone transceiver. The terminal can refer to access terminal, User Equipment (UE), user unit, user station, mobile station, mobile device, remote station, remote terminal, mobile equipment, user terminal, terminal, wireless communication equipment, user agent or user device.

The access terminal can be a cellular phone, a cordless phone, a Session Initiation Protocol (SIP) phone, a Wireless Local Loop (WLL) station, a Personal Digital Assistant (PDA), a handheld device with wireless communication functions, a computing device or other processing device connected to a wireless modem, an in-vehicle device, a wearable device, a terminal in 5G networks, or a terminal in the future evolved PLMN, etc.

According to some embodiments, a Device to Device (D2D) communication may be performed between the terminals 120.

According to some embodiments, the 5G system or 5G network may also be referred to as a New Radio (NR) system or NR network.

FIG. 1 exemplarily shows one network device and two terminals. According to other embodiments, the communication system 100 may include multiple network devices and the coverage of each network device may include other numbers of terminals, and embodiments of the present disclosure do not impose specific limitations on this.

According to some embodiments, the communication system 100 may further include other network entities such as a network controller or a mobility management entity, and embodiments of the present disclosure do not impose specific limitations on this.

It should be understood that a device with a communication function in the network/system in embodiments of the present disclosure may be referred to as a communication device. Taking the communication system 100 shown in FIG. 1 as an example, the communication device may include the network device 110 and the terminals 120 having a communication function.

The network device 110 and the terminals 120 may be the specific devices described above, and repeated descriptions will be omitted here. The communication device may also include other devices in the communication system 100, such as a network controller, a mobility management entity, or other network entities, and embodiments of the present disclosure do not impose specific limitations on this.

It should be understood that the terms "system" and "network" are often used interchangeably herein. The term "and/or" herein is only an association relationship describing associated objects, which means that there can be three kinds of relationships, for example, A and/or B can mean: A alone, B alone, and A and B together. In addition, the character "/" generally indicates that the associated objects before and after "/" are in an "or" relationship.

In order to facilitate the understanding of the technical solutions provided by embodiments of the present disclosure, related technologies involved in embodiments of the present disclosure are described below.

Multiple-Input Multiple-Output (MIMO) Transmission

MIMO has been widely used in wireless communication systems, such as 3G, 4G (LTE), 5G (NR), and WiFi. Using the MIMO technology, gains of the following forms can be obtained:

spatial diversity gain;
beamforming gain (precoding gain);
spatial multiplexing gain.

In order to obtain the beamforming gain (also called precoding gain) or spatial multiplexing gain, a transmitting end needs to determine a beamforming matrix (or precoding matrix) for signal transmission. For simplicity of description, "precoding" and "beamforming" will be used mixedly in the following description, and no distinction will be made. Even if any one of the terms is used, related description can be applied to both "precoding" and "beamforming" scenarios.

The determination of the precoding matrix often needs to be based on corresponding transmitting channel information. Optionally, on this basis, the determination of the precoding matrix may also be based on channel information, interference information and so on corresponding to paired users in multi-user MIMO. Therefore, for the determination of the precoding matrix of a terminal A, a basic requirement is to obtain a certain form of channel information of a transmitting channel corresponding to the terminal A.

In practical systems, for obtaining the channel information of the transmitting channel corresponding to terminal A, there can be the following two methods:

1. Feedback method: a base station B sends reference information X (for example, Channel State Information Reference Signal (CSI-RS)), the terminal A obtains corresponding downlink channel information by performing measurement according to the reference signal X, and then determines feedback information. The base station B determines a corresponding precoding matrix according to the feedback information from the terminal A, and sends Physical Downlink Shared Channel (PDSCH) or Physical Downlink Control Channel (PDCCH), or other downlink channel or reference signal to the terminal A. The feedback information may include the following forms (may include a part of the following information):

a. Rank Indication (RI) information, including rank information;
 b. Channel Quality Indicator (CQI) information, including information about Modulation and Coding Scheme (MC S);
 c. Precoding Matrix Indicator (PMI) information, including codebook information 2. Method based on channel reciprocity: the terminal A sends SRS information according to configuration information from base station B, and the base station B performs measurement to obtain a corresponding uplink channel according to the received SRS information. According to the reciprocity of the uplink and downlink channels, the base station B can determine that the corresponding precoding matrix corresponding to the terminal A is used to transmit PDSCH or PDCCH, or other downlink channel or reference signal.

It should be noted that the feedback method is suitable for Time Division Duplexing (TDD) systems and Frequency Division Duplexing (FDD) systems, and the method based on channel reciprocity is mainly suitable for TDD systems, and can also be applied in FDD systems with partial reciprocity.

Antenna Switching

It can be seen from the above technical solutions that the method based on channel reciprocity requires the terminal A to send the SRS signal. In NR, configuration of the SRS resource set corresponding to this type of SRS signal is as follows:

The usage parameter (usage) in SRS-ResourceSet is set to antenna switching (antennaSwitching).

The sounding procedure for this type of SRS signal is also called UE sounding procedure for DL CSI acquisition, and antenna switching is also called SRS transmission port switching (SRS Tx port switching), SRS switching or SRS transmission switching (SRS Tx switching).

Figure 21:
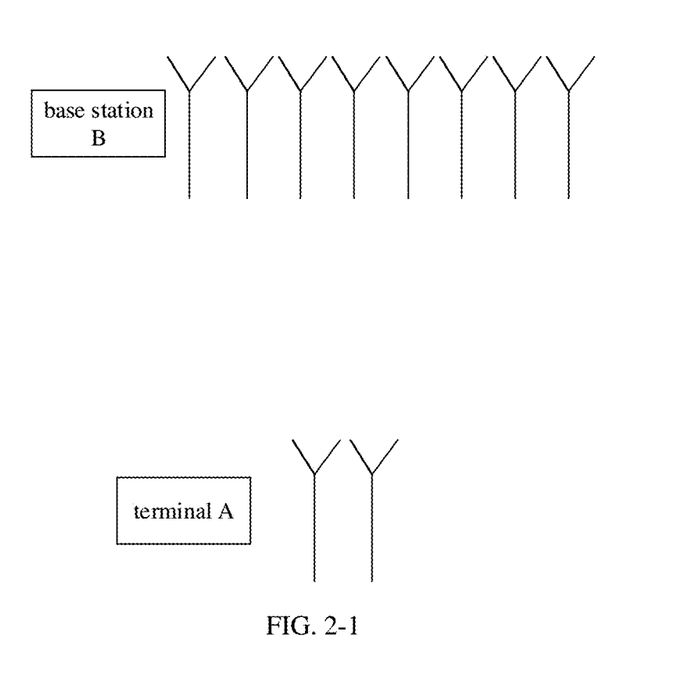

For a typical terminal (such as a smart phone), the number of receiving antennas is often greater than the number of transmitting antennas, or in other words, the number of receiving channels is often greater than the number of transmitting channels. For example, as shown in FIG. 2-1, the terminal A has two antennas. The terminal A supports one transmitting channel and two receiving channels, that is, at each moment, only one antenna is used for transmission (connected to the one transmitting channel), and two antennas can be used for reception. Therefore, if terminal A sends SRS (one transmitting channel, and the corresponding SRS resource is one SRS port) once, the base station B can only obtain 8*1 channel information, that is, channel information corresponding to half of the channels is not known, and this will affect obtaining of better precoding performance.

It should be noted that the above description assumes that the base station B transmits information to the terminal A through a precoding matrix, and the technical solutions in embodiments of the present disclosure can also be applied in a situation where a terminal B transmits information to the terminal A through a precoding matrix, and the communication between the two terminals is, for example, Device to Device (D2D) communication, or vehicle to X (V2X) communication, or sidelink communication.

In order to solve the above problem, the network can configure two SRS resources, each SRS resource has one SRS port, the two SRS resources are transmitted from two antennas, respectively, and the two SRS resources are transmitted at different times, for example, the SRS signal corresponding to SRS resource 0 is transmitted from antenna 0 at time T0 (the transmitting channel is switched to antenna 0 at this time), and the SRS signal corresponding to SRS resource 1 is transmitted from antenna 1 at time T1 (the transmitting channel is switched to antenna 1 at this time). In this way, by transmitting SRS twice, the base station B can obtain 8*2 channel information. The above two SRS resources are configured in the same SRS resource set, and the corresponding usage is set as "antennaSwitching".

Whether the terminal A supports "antennaSwitching" (this can be equivalently called as whether the terminal A supports SRS Tx port switching) and what type of antenna switching is supported can be implemented in different ways. Therefore, such information is reported through UE capability. The UE capability report corresponding to NR has the following: t1r2, t1r4, t2r4, t1r4-t2r4, t1r1, t2r2, t4r4, notSupported, where "t1r2" for 1T2R, "t2r4" for 2T4R, "t1r4" for 1T4R, "t1r4-t2r4" for 1T4R/2T4R, "t1r1" for 1T1R, "t2r2" for 2T2R, or "t4r4" for 4T4R. The corresponding description regarding each capability is as follows:

For 1T2R: 0 or 1 or 2 (maximum 2) SRS resource sets can be configured, and the resource type (resource Type) corresponding to the two SRS resource sets is configured as different values, that is, the resource type can be aperiodic or semi-persistent (SemiPersistent), or periodic.

When two SRS resource sets are subsequently configured, similar configurations can be made unless otherwise specified. Each SRS resource set contains two SRS resources, each SRS resource has one SRS port, the two SRS resources are transmitted at different symbols, and the two SRS resources in the same SRS resource set correspond to different antenna ports.

For 2T4R: 0 or 1 or 2 SRS resource sets can be configured. Each SRS resource set contains two SRS resources, each SRS resource has two SRS ports, the two SRS resources are transmitted at different symbols, and an antenna port pair corresponding to the SRS port pair of the second SRS resource in the same SRS resource set is different from an antenna port pair corresponding to the SRS port pair of the first SRS resource in the same SRS resource set.

For 1T4R: 0 or 1 SRS resource set can be configured (periodic or semi-persistent). Each SRS resource set contains four SRS resources, and each SRS resource has one SRS port. Different SRS resources are transmitted at different symbols, and different SRS resources correspond to different antenna ports.

For 1T4R: 0 or 2 SRS resource sets can be configured (all configured as aperiodic). There are a total of four SRS resources in the two SRS resource sets, each SRS resource has one SRS port, and the four SRS resources are transmitted on different symbols in two different slots. The four SRS resources correspond to different antenna ports. The four SRS resources may be that each SRS resource set contains two SRS resources, or that one SRS resource set contains three SRS resources, and the SRS resource set contains one SRS resource. The power parameters of RRC configurations corresponding to the two SRS resource sets are the same, and the higher layer parameter aperiodicSRS-Resource Trigger is the same, but the parameter slotOffSRS resource set is different.

For 1T=1R, or 2T=2R, or 4T=4R: 0 or 1 or 2 SRS resource sets can be configured, each SRS resource set contains one SRS resource, and the SRS port corresponding to the SRS resource is 1, 2 or 4.

If the UE reports that the UE supports "t1r4-t2r4", all SRS resources in the SRS resource sets need to be configured with the same SRS port (that is, one or two SRS ports).

Data transmission of terminals is often bursty, that is, sometimes the amount of data is very large, sometimes the amount of data is very small, and even only the basic connection is required to be maintained, and in this case, large transmission capacity is not needed, and a part of the uplink transmission channels may be turned off to reduce terminal power consumption, thereby improving user experience.

In antenna switching, if the terminal reports that the terminal supports "t1r4-t2r4" (that is, the terminal supports 1T4R/2T4R), for the scenario where the data rate requirement is low, the network can configure that the terminal only sends a SRS resource having one SRS port for antenna switching. In this case, the terminal can close one uplink transmitting channel, which can reduce power consumption and improve user experience.

Figure 22:
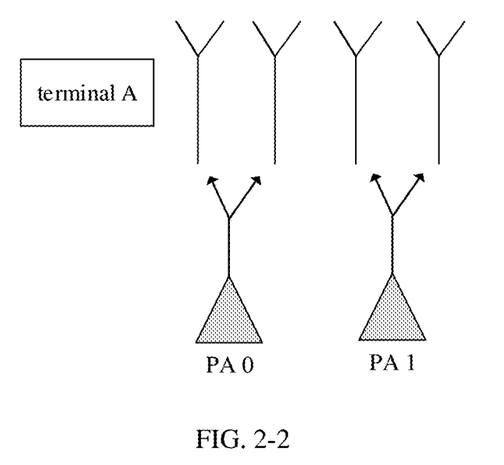

Another typical terminal implementation is shown in FIG. 2-2. The terminal A supports two transmitting channels (that is, corresponding to two Power Amplifiers (PAs)). If the terminal performs 2T4R, each PA (that is, each corresponding transmitting channel) is switched between the two antennas.

For a scenario where the data rate requirement is low, the terminal can actually turn off one PA (that is, turn off one transmitting channel) and only maintain one transmitting channel, which can effectively reduce power consumption and improve user performance. However, according to the technical solutions described above, the network side does not support such configuration.

Specifically, if the terminal supports 2T4R, the SRS resource configured by the network side need to have two SRS ports and cannot have one SRS port, and thus the terminal cannot realize the function of only maintaining one transmitting channel, and this is not beneficial to terminal power consumption and user experience. To this end, technical solutions according to embodiments of the present disclosure are proposed below.

Figure 3:
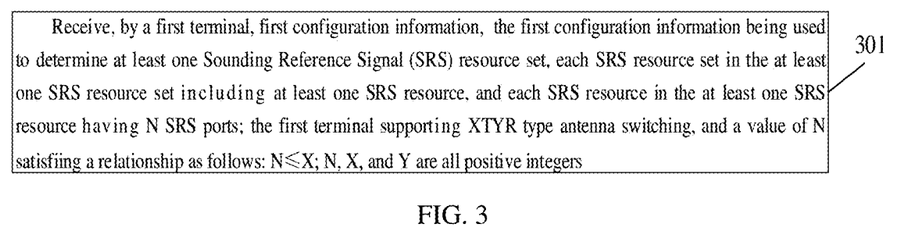
FIG. 3 is a schematic flowchart of an information configuration method according to an embodiment of the present disclosure.

FIG. 3 is a schematic flowchart of an information configuration method according to an embodiment of the present disclosure. As shown in FIG. 3, the information configuration method includes the following step.

In step 301, a first terminal receives first configuration information. The first configuration information is used to determine at least one SRS resource set, each SRS resource set in the at least one SRS resource set includes at least one SRS resource, and each SRS resource in the at least one SRS resource has N SRS ports. The first terminal supports XTYR type antenna switching, and a value of N satisfies a relationship as follows: N≤X; N, X, and Y are all positive integers.

In an exemplary implementation of the present disclosure, the first configuration information is used to determine one or two SRS resource sets.

Further, according to some embodiments, in the at least one SRS resource set, a usage parameter corresponding to each SRS resource set is set to a first value, and the first value is used to indicate that the SRS resource set is used for antenna switching.

Here, the usage parameter is set in a "usage" domain in a Radio Resource Control Information Element (RRC IE). Here, the expression "domain" can also be replaced with a "field". The first value is, for example, antennaSwitching, and the first value is used to indicate that the SRS resource set is used for antenna switching or SRS transmission port switching (SRS Tx port switching).

Further, according to some embodiments, in the at least one SRS resource set, resource type parameters corresponding to different SRS resource sets are set to different values.

Here, the value of each resource type parameter is one of the following:
a second value, wherein the second value is used to indicate that the SRS resource set is an aperiodic resource;
a third value, wherein the third value is used to indicate that the SRS resource set is a semi-persistent resource;
a fourth value, wherein the fourth value is used to indicate that the SRS resource set is a periodic resource.

In specific implementations, the resource Type in SRS-ResourceSet corresponding to different SRS resource sets is configured to be different values. For example, resource Type can be configured as one of the following: aperiodic, semi-Persistent, or periodic.

Further, according to some embodiments, the first configuration can be transmitted in any of the following ways:

1) The first configuration information is sent to the first terminal by a network device.

Here, the network device may be a base station, such as a gNB, or an eNB.

2) The first configuration information is sent by a second terminal to the first terminal.

Here, in a scenario of V2X communication, D2D communication, or sidelink communication, the first configuration information may be delivered to the first terminal through the second terminal.

In an embodiment of the present disclosure, the number of SRS ports corresponding to a SRS resource in the first configuration information is determined according to first capability information reported by the terminal. The first capability information reported by the terminal is used to indicate that the first terminal supports the XTYR type antenna switching.

According to some embodiments, the first terminal supporting XTYR type antenna switching may mean that the first terminal supports X transmitting channels and Y receiving channels. It should be noted that the channels here refer to radio frequency channels, and different channels can be associated with different antennas. The following describes how to configure the value of N using examples in which X and Y take different values.

In an exemplary embodiment, X=2 and Y=4, the first terminal reports the first capability information supported by the first terminal. The first capability information is used to indicate that the first terminal supports the 2T4R type antenna switching.

In specific implementations, the first capability information is called UE capability, and the value of UE capability is "t2r4" (i.e., 2T4R). Here, the reporting manner of the first capability information can be any of the following manners:

1) The first terminal reports the first capability information supported by the first terminal to the network device.

Here, the network device may be a base station, such as a gNB, or an eNB. For example, the first terminal reports the UE capability which the first terminal supports to the base station.

Further, according to some embodiments, the first capability information supported by the first terminal is forwarded by the network device to the second terminal. For example, after receiving the UE capability sent by the first terminal, the base station forwards the UE capability supported by the first terminal to the second terminal.

2) The first terminal reports the first capability information supported by the first terminal to the second terminal.

For example, in a scenario of V2X communication, D2D communication, or sidelink communication, the first terminal reports the UE capability which the first terminal supports to the second terminal.

In an embodiment, when the first terminal supports the 2T4R type antenna switching, the value of N can be determined using the following methods:

Method 1: N=2. Each SRS resource set includes two SRS resources, and each of all SRS resources in each SRS resource set has two SRS ports.

Further, according to some embodiments, different SRS resources in each SRS resource set are transmitted on different symbols. Specifically, the two SRS resources in each SRS resource set are transmitted on different symbols.

Further, according to some embodiments, there is a guard interval between different SRS resources, and the guard interval is determined based on subcarrier spacing. For example, the guard interval is Z symbols, and when the subcarrier spacing is 15 kHz, 30 kHz, or 60 kHz, Z is 1, and when the subcarrier spacing is 120 kHz, Z is 2.

Further, according to some embodiments, SRS port pairs of different SRS resources in the same SRS resource set correspond to different antenna port pairs.

Method 2: N=1. Each SRS resource set includes two SRS resources, and each of all SRS resources in each SRS resource set has one SRS port.

This situation supports the fallback of the first terminal from 2T4R to 1T2R, thereby saving terminal power consumption and improving user experience.

According to some embodiments, the network device or the second terminal notifies the above configuration (that is, the configuration in which each SRS resource set includes two SRS resources, and each SRS resource has one SRS port). For example, in a scenario where the transmission rate requirement is not high, the network or the second terminal adopts the above configuration.

Further, according to some embodiments, different SRS resources in each SRS resource set are transmitted on different symbols. Specifically, the two SRS resources in each SRS resource set are transmitted on different symbols.

Further, according to some embodiments, there is a guard interval between the different SRS resources, and the guard interval is determined based on subcarrier spacing. For example, the guard interval is Z symbols; when the subcarrier spacing is 15 kHz, 30 kHz, or 60 kHz, Z is 1, and when the subcarrier spacing is 120 kHz, Z is 2.

Further, according to some embodiments, SRS ports of different SRS resources in the same SRS resource set correspond to different antenna ports.

Method 3: N=1. Each SRS resource set includes one SRS resource, and each SRS resource in each SRS resource set has one SRS port.

This situation supports the fallback of the first terminal from 2T4R to 1T1R, thereby saving terminal power consumption and improving user experience.

According to some embodiments, the network device or the second terminal notifies the above configuration (that is, the configuration in which each SRS resource set includes one SRS resource, and each SRS resource has one SRS port). For example, in a scenario where the transmission rate requirement is not high, the network or the second terminal adopts the above configuration.

In some embodiments of the present disclosure, after receiving the first configuration information, the first terminal sends an SRS signal based on the first configuration information. According to some embodiments, the SRS signal is used by the network device or the second terminal to perform measurements and determine based on the measurement result the corresponding precoding when performing transmissions to the first terminal. Further, the network device or the second terminal transmits PDSCH or PDCCH or other channel or signal through the precoding.

The technical solutions according to embodiments of the present disclosure require minor changes to protocols, which is convenient for reducing the complexity of the terminal and the network.

In an exemplary embodiment, X=1, Y=2–X=2, Y=4, the first terminal reports the first capability information supported by the first terminal. The first capability information is used to indicate that the first terminal supports both the 1T2R and 2T4R type antenna switching.

In specific implementations, the first capability information is called UE capability, and the value of UE capability is "t1r2-t2r4" (i.e., the UE supports both 1T2R and 2T4R). Here, "t1r2-t2r4" corresponds to 1T2R/2T4R.

Here, the reporting manner of the first capability information can be any of the following manners:

1) The first terminal reports the first capability information supported by the first terminal to the network device.

Here, the network device may be a base station, such as a gNB, or an eNB. For example, the first terminal reports the UE capability which the first terminal supports to the base station.

Further, according to some embodiments, all or a part of the contents in the first capability information supported by the first terminal is forwarded by the network device to the second terminal. For example, after receiving the UE capability sent by the first terminal, the base station forwards the UE capability (the UE capability indicating that the UE supports 1T2R and/or 2T4R) supported by the first terminal to the second terminal.

2) The first terminal reports the first capability information supported by the first terminal to the second terminal.

For example, in a scenario of V2X communication, D2D communication, or sidelink communication, the first terminal reports the UE capability which the first terminal supports to the second terminal.

In an embodiment, when the first terminal supports both the 1T2R and 2T4R type antenna switching, the value of N can be determined using the following methods:

Method 1: N=2. Each SRS resource set includes two SRS resources, and each of all SRS resources in each SRS resource set has two SRS ports.

Further, according to some embodiments, different SRS resources in each SRS resource set are transmitted on different symbols. Specifically, the two SRS resources in each SRS resource set are transmitted on different symbols.

Further, according to some embodiments, there is a guard interval between different SRS resources, and the guard interval is determined based on subcarrier spacing. For example, the guard interval is Z symbols, and when the subcarrier spacing is 15 kHz, 30 kHz, or 60 kHz, Z is 1, and when the subcarrier spacing is 120 kHz, Z is 2.

Further, according to some embodiments, SRS port pairs of different SRS resources in the same SRS resource set correspond to different antenna port pairs.

Method 2: N=1. Each SRS resource set includes two SRS resources, and each of all SRS resources in each SRS resource set has one SRS port.

This situation supports the fallback of the first terminal from 2T4R to 1T2R, thereby saving terminal power consumption and improving user experience.

According to some embodiments, the network device or the second terminal notifies the above configuration (that is, the configuration in which each SRS resource set includes two SRS resources, and each SRS resource has one SRS port). For example, in a scenario where the transmission rate requirement is not high, the network or the second terminal adopts the above configuration.

Further, according to some embodiments, different SRS resources in each SRS resource set are transmitted on different symbols. Specifically, the two SRS resources in each SRS resource set are transmitted on different symbols.

Further, according to some embodiments, there is a guard interval between the different SRS resources, and the guard interval is determined based on subcarrier spacing. For example, the guard interval is Z symbols; when the subcarrier spacing is 15 kHz, 30 kHz, or 60 kHz, Z is 1, and when the subcarrier spacing is 120 kHz, Z is 2.

Further, according to some embodiments, SRS ports of different SRS resources in the same SRS resource set correspond to different antenna ports.

In some embodiments of the present disclosure, after receiving the first configuration information, the first terminal sends an SRS signal based on the first configuration information. According to some embodiments, the SRS signal is used by the network device or the second terminal to perform measurements and determine based on the measurement result the corresponding precoding when performing transmissions to the first terminal. Further, the network device or the second terminal transmits PDSCH or PDCCH or other channel or signal through the precoding.

In the technical solutions according to embodiments of the present disclosure, a new UE capability (that is, a terminal capability indicating that the UE supports both 1T2R and 2T4R) is introduced, thereby avoiding confusion between Rel-15 existing UE capabilities and the new UE capability, and facilitating network management and configuration.

In an exemplary embodiment, X=1, Y=1–X=1, Y=2–X=2, Y=4, the first terminal reports the first capability information supported by the first terminal. The first capability information is used to indicate that the first terminal supports all of the 1T1R, 1T2R and 2T4R type antenna switching.

In specific implementations, the first capability information is called UE capability, and the value of UE capability is "t1r1-t1r2-t2r'" (i.e., the UE supports all of 1T1R, 1T2R and 2T4R). Here, "t1r1-t1r2-t2r4" correspond to 1T1R/1T2R/2T4R.

Here, the reporting manner of the first capability information can be any of the following manners:

1) The first terminal reports the first capability information supported by the first terminal to the network device.

Here, the network device may be a base station, such as a gNB, or an eNB. For example, the first terminal reports the UE capability which the first terminal supports to the base station.

Further, according to some embodiments, all or a part of the contents in the first capability information supported by the first terminal is forwarded by the network device to the second terminal. For example, after receiving the UE capability sent by the first terminal, the base station forwards the UE capability (e.g., the first terminal supports 1T1R and/or 1T2R and/or 2T4R) supported by the first terminal to the second terminal.

2) The first terminal reports the first capability information supported by the first terminal to the second terminal.

For example, in a scenario of V2X communication, D2D communication, or sidelink communication, the first terminal reports the UE capability which the first terminal supports to the second terminal.

In an embodiment, when the first terminal supports all of 1T1R, 1T2R and 2T4R type antenna switching, the value of N can be determined using the following methods:

Method 1: N=2. Each SRS resource set includes two SRS resources, and each of all SRS resources in each SRS resource set has two SRS ports.

Further, according to some embodiments, different SRS resources in each SRS resource set are transmitted on different symbols. Specifically, the two SRS resources in each SRS resource set are transmitted on different symbols.

Further, according to some embodiments, there is a guard interval between different SRS resources, and the guard interval is determined based on subcarrier spacing. For example, the guard interval is Z symbols, and when the subcarrier spacing is 15 kHz, 30 kHz, or 60 kHz, Z is 1, and when the subcarrier spacing is 120 kHz, Z is 2.

Further, according to some embodiments, SRS port pairs of different SRS resources in the same SRS resource set correspond to different antenna port pairs.

Method 2: N=1. Each SRS resource set includes two SRS resources, and each of all SRS resources in each SRS resource set has one SRS port.

This situation supports the fallback of the first terminal from 2T4R to 1T2R, thereby saving terminal power consumption and improving user experience.

According to some embodiments, the network device or the second terminal notifies the above configuration (that is, the configuration in which each SRS resource set includes two SRS resources, and each SRS resource has one SRS port). For example, in a scenario where the transmission rate requirement is not high, the network or the second terminal adopts the above configuration.

Further, according to some embodiments, different SRS resources in each SRS resource set are transmitted on different symbols. Specifically, the two SRS resources in each SRS resource set are transmitted on different symbols.

Further, according to some embodiments, there is a guard interval between the different SRS resources, and the guard interval is determined based on subcarrier spacing. For example, the guard interval is Z symbols; when the subcarrier spacing is 15 kHz, 30 kHz, or 60 kHz, Z is 1, and when the subcarrier spacing is 120 kHz, Z is 2.

Further, according to some embodiments, SRS ports of different SRS resources in the same SRS resource set correspond to different antenna ports.

Method 3: N=1. Each SRS resource set includes one SRS resource, and each SRS resource in each SRS resource set has one SRS port.

This situation supports the fallback of the first terminal from 2T4R to 1T1R, thereby saving terminal power consumption and improving user experience.

According to some embodiments, the network device or the second terminal notifies the above configuration (that is, the configuration in which each SRS resource set includes one SRS resource, and each SRS resource has one SRS port). For example, in a scenario where the transmission rate requirement is not high, the network or the second terminal adopts the above configuration.

In some embodiments of the present disclosure, after receiving the first configuration information, the first terminal sends an SRS signal based on the first configuration information.

According to some embodiments, the SRS signal is used by the network device or the second terminal to perform measurements and determine based on the measurement result the corresponding precoding when performing transmissions to the first terminal. Further, the network device or the second terminal transmits PDSCH or PDCCH or other channel or signal through the precoding.

In the technical solutions according to embodiments of the present disclosure, a new UE capability (that is, a terminal capability indicating that the UE supports all of 1T1R, 1T2R and 2T4R) is introduced, thereby avoiding confusion between Rel-15 existing UE capabilities and the new UE capability, and facilitating network management and configuration.

In an exemplary implementation of the present disclosure, the first terminal reports terminal assistance information (UE assistance information). The terminal assistance information carries second capability information of the first terminal.

According to some embodiments, the terminal assistance information may be used to update terminal capabilities, or short-term terminal capabilities, or suggestions for related capabilities of the terminal. In specific implementations, the terminal assistance information is transmitted through RRC signaling.

Further, according to some embodiments, the reporting manner of the terminal assistance information can be any of the following manners:

1) The first terminal reports the terminal assistance information to the network device.

Here, the network device may be a base station, such as a gNB, or an eNB.

Further, according to some embodiments, the terminal assistance information is forwarded to the second terminal by the network device. For example, after receiving the terminal assistance information sent by the first terminal, the base station forwards the terminal assistance information to the second terminal.

2) The first terminal reports the terminal assistance information to the second terminal.

For example, in a scenario of V2X communication, D2D communication, or sidelink communication, the first terminal reports the terminal assistance information to the second terminal.

Further, according to some embodiments, the second capability information carried in the terminal assistance information can have the following implementations:

Implementation 1: the second capability information is used to indicate that the first terminal supports 1T2R (i.e., "t1r2") type antenna switching.

Implementation 2: the second capability information is used to indicate that the first terminal supports 1T1R (i.e., "t1r1") type antenna switching.

Implementation 3: the second capability information is used to indicate that the first terminal supports 2T4R (i.e., "t2r4") type antenna switching.

Further, according to some embodiments, the terminal assistance information is reported through overheating protection assistance information (overheating assistance information).

In specific implementations, the terminal assistance information is reported through the following RRC IE: OverheatingAssistance.

Further, according to some embodiments, before the first terminal reports the terminal assistance information, the first terminal reports the first capability information supported by the first terminal. For example, the first capability information is used to indicate that the first terminal supports the 2T4R type antenna switching, or supports both the 1T2R and 2T4R type antenna switching, or supports all of the 1T1R, 1T2R, and 2T4R type antenna switching, or supports the 1T1R type antenna switching.

Here, details regarding the first terminal reporting the first capability information supported by the first terminal reported may be found in the previous descriptions regarding the first capability information.

Further, according to some embodiments, a terminal capability indicated by the second capability information is lower than or equal to a terminal capability indicated by the first capability information.

Here, the second capability information is used for a temporary reduction of the terminal capability, so as to implement the fallback of the terminal capability, and simplify the configuration procedure and the implementations of the network and the terminal.

Further, according to some embodiments, the second capability information is independent of the first capability information. Specifically, the UE capability indicated by the terminal assistance information reported by the first terminal may be lower than, equal to, or higher than the UE capability reported by the UE capability.

Here, the second capability information may be used for terminal capability enhancement, which is suitable for some new-form terminals, for example, the capability may be enhanced after the screen of a foldable mobile phone is unfolded.

Further, according to some embodiments, if the terminal assistance information does not carry the second capability information of the first terminal, the first capability information is used.

Specifically, if the terminal assistance information does not carry the second capability information, the network device or the second terminal uses the first capability information reported in the UE capability. It should be noted that both the first capability information and the second capability information refer to information related to antenna switching.

Further, according to some embodiments, if the terminal assistance information carries the second capability information of the first terminal, the second capability information is used until the first terminal updates reporting of the second capability information.

Specifically, if the network device or the second terminal receives the terminal assistance information and the terminal assistance information carries the second capability information, the network device or the second terminal keeps using the second capability information until the terminal reports the updated second capability information. It should be noted that both the first capability information and the second capability information refer to information related to antenna switching.

Further, according to some embodiments, if the terminal assistance information carries second capability information of the first terminal, the second capability information is used until a first timer is expired.

Specifically, if the first terminal reports the terminal assistance information, and the terminal assistance information carries the second capability information, the network device or the second terminal keeps using the second capability information until the first timer is expired (or the timing is stopped). Using the first timer to control the use range of the second capability (as a temporary capability), especially in the case of capability fallback, can flexibly control the terminal to work in a high-rate state or a low-rate state.

Further, according to some embodiments, the restart or start of the first timer complies with one or more of the following rules:

Rule 1: the first timer is restarted or started in a case that the first terminal reports the second capability information or indicates to support maintaining of a second capability.

Specifically, if the first terminal reports the second capability information or reports indication information which is used to indicate maintaining the existing second capability, then the first timer is restarted or started.

It should be noted that when the first terminal reports the second capability information, if the newly reported second capability information is consistent with the current second capability information of the terminal (or the second capability information reported last time), the first timer is restarted or started. Alternatively, the first terminal reports indication information which is used to indicate that the existing second capability is maintained, then the first timer is restarted or started.

Rule 2: when the first terminal updates and reports the second capability information, the first timer is restarted or started.

Specifically, when the first terminal reports the second capability information, if the newly reported second capability information is inconsistent with the current second capability information of the terminal (or the second capability information reported last time), the first timer is restarted or started.

Rule 3: if the second capability information reported by the first terminal is consistent with the first capability information, the first timer is stopped.

Specifically, if the second capability information reported by the first terminal is the same as the first capability information reported in the UE capability, the first timer is stopped.

Rule 4: when the first terminal reports indication to indicate that the first capability information is used, the first timer is stopped.

Specifically, if the first terminal reports indication information indicating that the first capability information reported in the UE capability is used, the first timer is stopped.

The first timer in the above solutions is configured by the network device or the second terminal.

It should be noted that the first capability information in the embodiments of the present disclosure can be understood with reference to the foregoing description related to the first capability information.

The previous embodiments take the terminal that supports the 2T4R type antenna switching as an example. In fact, the foregoing method can be simply analogized to a terminal that supports other types of antenna switching. For example, a terminal that supports 2T2R type antenna switching can also support 1T2R and/or 1T1R type antenna switching through methods similar to the above-mentioned methods, thereby reducing power consumption. For another example, if a terminal supports 4T4R type antenna switching, it can also support 1T1R and/or 1T2R and/or 2T4R type antenna switching through methods similar to the above-mentioned methods, thereby reducing power consumption. Since the analogy of the methods is relatively straightforward, details are omitted here.

Figure 4:
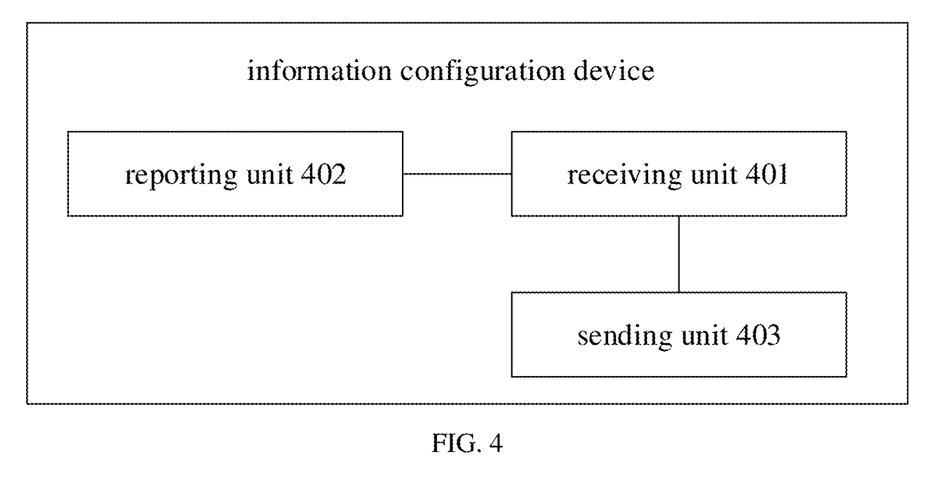
FIG. 4 is a schematic diagram showing a structural composition of an information configuration device according to an embodiment of the present disclosure.

FIG. 4 is a schematic diagram showing the structural composition of the information configuration device according to an embodiment of the present disclosure. As shown in FIG. 4, the information configuration device includes a receiving unit 401.

The receiving unit 401 is configured to receive first configuration information. The first configuration information is used to determine at least one SRS resource set, each SRS resource set in the at least one SRS resource set includes at least one SRS resource, and each SRS resource in the at least one SRS resource has N SRS ports;

the first terminal supports XTYR type antenna switching, and a value of N satisfies a relationship as follows: $N \leq X$; N, X, and Y are all positive integers.

In an implementation, the first configuration information is used to determine one or two SRS resource sets.

In an implementation, in the at least one SRS resource set, a usage parameter corresponding to each SRS resource set is set to a first value, and the first value is used to indicate that the SRS resource set is used for antenna switching.

In an implementation, in the at least one SRS resource set, resource type parameters corresponding to different SRS resource sets are set to different values.

In an implementation, a value of each of the resource type parameters is one of the following:

a second value, wherein the second value is used to indicate that the SRS resource set is an aperiodic resource;

a third value, wherein the third value is used to indicate that the SRS resource set is a semi-persistent resource;

a fourth value, wherein the fourth value is used to indicate that the SRS resource set is a periodic resource.

In an implementation, the first configuration information is sent to the first terminal by a network device.

In an implementation, the first configuration information is sent by a second terminal to the first terminal.

In an implementation, each SRS resource set includes two SRS resources, and each of all SRS resources in each SRS resource set has two SRS ports.

In an implementation, SRS port pairs of different SRS resources in a same SRS resource set correspond to different antenna port pairs.

In an implementation, each SRS resource set includes two SRS resources, and each of all SRS resources in each SRS resource set has one SRS port.

In an implementation, SRS ports of different SRS resources in a same SRS resource set correspond to different antenna ports.

In an implementation, different SRS resources in each SRS resource set are transmitted on different symbols.

In an implementation, there is a guard interval between the different SRS resources, and the guard interval is determined based on subcarrier spacing.

In an implementation, each SRS resource set includes one SRS resource, and each SRS resource in each SRS resource set has one SRS port.

In an implementation, the device further includes:
a reporting unit 402 configured to report first capability information supported by the first terminal, wherein the first capability information is used to indicate that the first terminal supports 2T4R type antenna switching.

In an implementation, the device further includes:
a reporting unit 402 configured to report first capability information supported by the first terminal, wherein the first capability information is used to indicate that the first terminal supports both 1T2R and 2T4R type antenna switching.

In an implementation, the device further includes:
a reporting unit 402 configured to report first capability information supported by the first terminal, wherein the first capability information is used to indicate that the first terminal supports all of 1T1R, 1T2R, and 2T4R type antenna switching.

In an implementation, the reporting unit 402 is configured to:
report the first capability information supported by the first terminal to a network device.

In an implementation, all or part of contents in the first capability information supported by the first terminal is forwarded by the network device to a second terminal.

In an implementation, the reporting unit 402 is configured to:
report the first capability information supported by the first terminal to a second terminal.

In an implementation, the device further includes:
a reporting unit 402 configured to report terminal assistance information.

In an implementation, the terminal assistance information carries second capability information of the first terminal.

In an implementation, the second capability information is used to indicate that the first terminal supports 2T4R type antenna switching.

In an implementation, the second capability information is used to indicate that the first terminal supports 1T2R type antenna switching.

In an implementation, the second capability information is used to indicate that the first terminal supports 1T1R type antenna switching.

In an implementation, the terminal assistance information is reported through overheating protection assistance information.

In an implementation, the reporting unit 402 is configured to:
report the terminal assistance information to a network device.

In an implementation, the terminal assistance information is forwarded by the network device to a second terminal.

In an implementation, the reporting unit 402 is configured to:
report the terminal assistance information to a second terminal.

In an implementation, before the reporting unit 402 reports the terminal assistance information, the reporting unit 402 reports first capability information supported by the first terminal, the first capability information is used to indicate that the first terminal supports 2T4R type antenna switching, or supports both 1T2R and 2T4R type antenna switching, or supports all of 1T1R, 1T2R and 2T4R type antenna switching.

In an implementation, a terminal capability indicated by the second capability information is lower than or equal to a terminal capability indicated by the first capability information.

In an implementation, if the terminal assistance information does not carry second capability information of the first terminal, first capability information is used.

In an implementation, if the terminal assistance information carries second capability information of the first terminal, the second capability information is used until the first terminal updates reporting of the second capability information.

In an implementation, if the terminal assistance information carries second capability information of the first terminal, the second capability information is used until a first timer is expired.

In an implementation, the first timer is restarted or started in a case that the reporting unit 402 reports the second capability information or indicates to support maintaining of a second capability.

In an implementation, the first timer is restarted or started when the reporting unit 402 updates reporting of the second capability information.

In an implementation, the first timer is stopped when the second capability information reported by the reporting unit is consistent with the first capability information.

In an implementation, the first timer is stopped when the reporting unit 402 reports indication to indicate that the first capability information is used.

In an implementation, the first timer is configured by a network device or a second terminal.

In an implementation, the device further includes:
a sending unit 403 configured to send an SRS signal based on the first configuration information. According to some embodiments, the SRS signal is used by the network device or the second terminal to perform measurements and determine based on the measurement result the corresponding precoding when performing transmissions to the first terminal.

Those skilled in the art should understand that details regarding the information configuration device in the embodiments of the present disclosure can be found in the descriptions related to the information configuration method in embodiments of the present disclosure.

Figure 5:
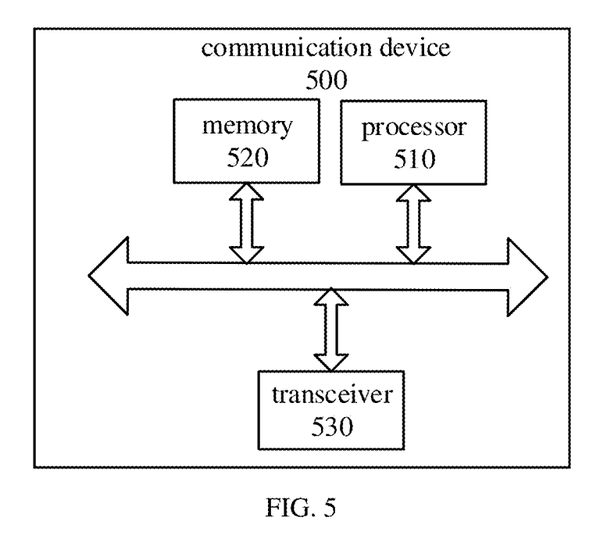
FIG. 5 is a schematic structural diagram of a communication device according to an embodiment of the present disclosure.

FIG. 5 is a schematic structural diagram of a communication device 500 according to an embodiment of the present disclosure. The communication device may be a terminal, or may be a network device. The communication device 500 shown in FIG. 5 includes a processor 510, and the processor 510 may call and run a computer program from a memory to perform the method in embodiments of the present disclosure.

According to embodiments, as shown in FIG. 5, the communication device 500 may further include a memory 520. The processor 510 may call and run a computer program from the memory 520 to perform the method in embodiments of the present disclosure.

The memory 520 may be a separate device independent of the processor 510, or may be integrated in the processor 510.

According to embodiments, as shown in FIG. 5, the communication device 500 may further include a transceiver 530, and the processor 510 may control the transceiver 530 to communicate with other devices. Specifically, the transceiver may send information or data to other devices, or receive information or data sent by other devices.

The transceiver 530 may include a transmitter and a receiver. The transceiver 630 may further include one or more antennas.

According to embodiments, the communication device 500 may specifically be the network device according to an embodiment of the present disclosure, and the communication device 500 may implement the corresponding processes implemented by the network device in the method embodiments of the present disclosure.

According to embodiments, the communication device 500 may specifically be the mobile terminal/terminal in embodiments of the present disclosure, and the communication device 500 may implement the corresponding processes implemented by the mobile terminal/terminal in the method embodiments of the present disclosure. For brevity, details are not repeated here.

Figure 6:
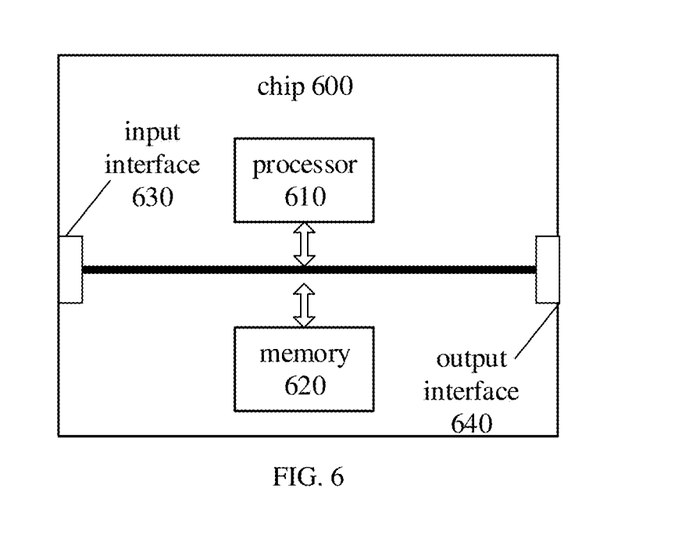
FIG. 6 is a schematic structural diagram of a chip according to an embodiment of the present disclosure.

FIG. 6 is a schematic structural diagram of a chip according to an embodiment of the present disclosure. The chip 600 shown in FIG. 6 includes a processor 610, and the processor 610 can call and run a computer program from a memory to implement the method according to embodiments of the present disclosure.

According to embodiments, as shown in FIG. 6, the chip 600 may further include a memory 620. The processor 610 may call and run a computer program from the memory 620 to implement the method according to embodiments of the present disclosure.

The memory 620 may be a separate device independent of the processor 610, or may be integrated in the processor 610.

According to embodiments, the chip 600 may further include an input interface 630. The processor 610 may control the input interface 630 to communicate with other devices or chips, and specifically, the processor 610 can control the input interface to obtain information or data sent by other devices or chips.

According to embodiments, the chip 600 may further include an output interface 640. The processor 610 can control the output interface 640 to communicate with other devices or chips, and specifically, the processor 610 can control the output interface 640 to output information or data to other devices or chips.

According to embodiments, the chip can be applied to the network device in embodiments of the present disclosure, and the chip can implement the corresponding processes implemented by the network device in various methods according to embodiments of the present disclosure. For brevity, details are not repeated herein again.

According to embodiments, the chip can be applied to the mobile terminal/terminal in embodiments of the present disclosure, and the chip can implement the corresponding processes implemented by the mobile terminal/terminal in various methods according to embodiments of the present disclosure. For brevity, details are not repeated herein again.

It should be understood that the chip in the embodiments of the present disclosure may also be referred to as a system-level chip, a system chip, a chip system, or a system-on-chip, etc.

Figure 7:
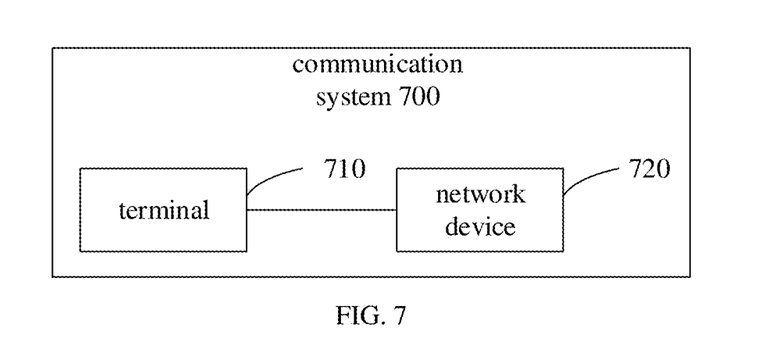
FIG. 7 is a schematic block diagram of a communication system according to an embodiment of the present disclosure.

FIG. 7 is a schematic block diagram of a communication system 700 according to an embodiment of the present disclosure. As shown in FIG. 7, the communication system 700 includes a terminal 710 and a network device 720.

The terminal 710 may be used to implement the corresponding functions implemented by the terminal in the foregoing method embodiments, and the network device 720 may be used to implement the corresponding functions implemented by the network device in the foregoing method embodiments. For brevity, details are not described herein again.

It should be understood that the processor in embodiments of the present disclosure may be an integrated circuit chip with signal processing capability.

In implementations, the steps of the foregoing method embodiments can be completed by hardware integrated logic circuits in the processor or instructions in the form of software.

The above-mentioned processor may be a general-purpose processor, a Digital Signal Processor (DSP), an Application Specific Integrated Circuit (ASIC), a Field Programmable Gate Array (FPGA) or other programmable logic device, discrete gate or transistor logic device, discrete hardware component.

The methods, steps, and logical block diagrams disclosed in the embodiments of the present disclosure can be implemented or executed. The general-purpose processor may be a microprocessor or the processor may also be any conventional processor or the like.

The steps of the methods disclosed in the embodiments of the present disclosure may be directly embodied as being executed and completed by a hardware decoding processor, or executed by a combination of hardware and software modules in the decoding processor.

The software module can be located in a storage medium in the field, such as random access memory, flash memory, read-only memory, programmable read-only memory, or electrically erasable programmable memory, register. The storage medium is located in the memory, and the processor reads the information in the memory to perform the steps of the above methods in combination with hardware.

It can be understood that the memory in the embodiments of the present disclosure may be volatile memory or non-volatile memory, or may include both volatile and non-volatile memory. The non-volatile memory can be Read-Only Memory (ROM), Programmable ROM (PROM), Erasable PROM (EPROM), Electrically EPROM (EEPROM) or flash memory. The volatile memory may be a Random Access Memory (RAM), which is used as an external cache.

By way of exemplary rather than limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), or Direct Rambus RAM (DR RAM). It should be noted that the memory in the systems and methods described in the present disclosure is intended to include but not limited to these and any other suitable types of memory.

It should be understood that the foregoing memory is exemplary but not restrictive. For example, the memory in embodiments of the present disclosure may also be Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), or Direct Rambus RAM (DR RAM), and so on. That is to say, the memory in embodiments of the present disclosure is intended to include but not limited to these and any other suitable types of memory.

An embodiment of the present disclosure also provides a computer-readable storage medium for storing computer programs.

According to embodiments, the computer-readable storage medium may be applied to the network device in embodiments of the present disclosure, and the computer programs cause a computer to perform the corresponding processes implemented by the network device in each method embodiment of the present disclosure. For brevity, repeated descriptions are omitted here.

According to embodiments, the computer-readable storage medium may be applied to the mobile terminal/terminal in embodiments of the present disclosure, and the computer programs cause a computer to perform the corresponding processes implemented by the mobile terminal/terminal in each method embodiment of the present disclosure. For brevity, repeated descriptions are omitted here.

An embodiment of the present disclosure provides a computer program product, including computer program instructions.

According to embodiments, the computer program product may be applied to the network device in embodiments of the present disclosure, and the computer program instructions cause a computer to perform the corresponding processes implemented by the network device in each method embodiment of the present disclosure. For brevity, repeated descriptions are omitted here.

According to embodiments, the computer program product may be applied to the mobile terminal/terminal in embodiments of the present disclosure, and the computer program instructions cause a computer to perform the corresponding processes implemented by the mobile terminal/terminal in each method embodiment of the present disclosure. For brevity, repeated descriptions are omitted here.

An embodiment of the present disclosure also provides a computer program.

According to embodiments, the computer program may be applied to the network device in embodiments of the present disclosure, and when the computer program runs on a computer, the computer is caused to perform the corresponding processes implemented by the network device in each method embodiment of the present disclosure. For brevity, repeated descriptions are omitted here.

According to embodiments, the computer program may be applied to the mobile terminal/terminal in embodiments of the present disclosure, and when the computer program runs on a computer, the computer is caused to perform the corresponding processes implemented by the mobile terminal/terminal in each method embodiment of the present disclosure. For brevity, repeated descriptions are omitted here.

Those of ordinary skill in the art will appreciate that the exemplary units and algorithm steps described according to embodiments disclosed herein can be carried out by electronic hardware or a combination of electronic hardware and computer software. Whether the functions are implemented by hardware or software depends on particular applications and design constraints of the technical solutions.

For each of the particular applications, a person skilled in the art can use different methods to implement the described functions, but such implementation should not be considered as beyond the scope of the present disclosure.

It may be clearly understood by those skilled in the art that details of specific operation procedures of the systems, devices and units can be found in the previous description regarding the method embodiments.

In the embodiments provided in the present disclosure, it should be understood that the disclosed systems, devices and methods may be implemented in other ways. For example, the device embodiments described above are merely illustrative. For example, the division of the units is only a kind of logical function division.

In practice, other division manner may be used. For example, multiple units or components may be combined or integrated into another system, or some features may be ignored or not performed.

In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the embodiments.

In addition, the functional units in the embodiments of the present disclosure may be integrated in one processing unit, or the units may exist alone physically, or two or more units may be integrated in one unit.

The functions may also be stored in a computer-readable storage medium if being implemented in the form of a software functional unit and sold or used as an independent product.

Based on such understanding, the essence of the technical solutions of the present disclosure, or the part contributing to the prior art or part of the technical solutions, may be embodied in the form of a software product.

The computer software product is stored in a storage medium including a number of instructions such that a computer device (which may be a personal computer, a server, or a network device, etc.) performs all or part of steps of the method described in each of the embodiments of the present disclosure.

The foregoing storage medium includes: any medium that is capable of storing program codes such as a USB disk, a mobile hard disk, a Read-Only Memory (ROM), a Random Access Memory (RAM), a magnetic disk or an optical disk, and the like.

The foregoing descriptions are merely exemplary embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defied by the appended claims.

What is claimed is:

1. An information configuration method, comprising:
reporting, by a first terminal, first capability information comprising one capability value indicating that the first terminal supports all of 1T1R type antenna switching, 1T2R type antenna switching, and 2T4R type antenna switching;
receiving, by the first terminal, first configuration information which is configured by a network device according to the first capability information, wherein the first configuration information is configuration information which allows the first terminal to switch from the 2T4R type antenna switching to the 1T2R type antenna switching or configuration information which allows the first terminal to switch from the 2T4R type antenna switching to the 1T1R type antenna switching, and the first configuration information is used to determine at least one Sounding Reference Signal (SRS) resource set, each SRS resource set in the at least one SRS resource set comprises at least one SRS resource, and each SRS resource in the at least one SRS resource has N SRS ports;

wherein in response to that the first configuration information is configuration information which allows the first terminal to switch from the 2T4R type antenna switching to the 1T1R type antenna switching, the each SRS set comprises one SRS resource, and the each SRS resource has one SRS port;

wherein in response to that the first configuration information is configuration information which allows the first terminal to switch from the 2T4R type antenna switching to the 1T2R type antenna switching, the each SRS set comprises two SRS resources, and the each SRS resource has one SRS port;

and sending, by the first terminal, an SRS signal based on the first configuration information.

2. The method according to claim 1, wherein the first configuration information is used to determine one or two SRS resource sets.

3. The method according to claim 1, wherein in the at least one SRS resource set, a usage parameter corresponding to the each SRS resource set is set to a first value, and the first value is used to indicate that the each SRS resource set is used for antenna switching.

4. The method according to claim 1, wherein in the at least one SRS resource set, resource type parameters corresponding to different SRS resource sets are set to different values.

5. The method according to claim 4, wherein a value of each of the resource type parameters is one of the following:
a second value, wherein the second value is used to indicate that the each SRS resource set is an aperiodic resource;
a third value, wherein the third value is used to indicate that the each SRS resource set is a semi-persistent resource; and
a fourth value, wherein the fourth value is used to indicate that the each SRS resource set is a periodic resource.

6. The method according to claim 1, wherein SRS ports of different SRS resources in a same SRS resource set correspond to different antenna ports.

7. A terminal device, comprising: a processor, a transceiver, and a memory for storing instructions that, when executed by the processor, cause the terminal device to perform a plurality of operations comprising:
reporting first capability information comprising one capability value indicating that the terminal device supports all of 1T1R type antenna switching, 1T2R type antenna switching, and 2T4R type antenna switching;
receiving first configuration information which is configured by a network device according to the first capability information, wherein the first configuration information is configuration information which allows the first terminal to switch from the 2T4R type antenna switching to the 1T2R type antenna switching or configuration information which allows the first terminal to switch from the 2T4R type antenna switching to the 1T1R type antenna switching, and the first configuration information is used to determine at least one Sounding Reference Signal (SRS) resource set, each SRS resource set in the at least one SRS resource set comprises at least one SRS resource, and each SRS resource in the at least one SRS resource has N SRS ports;

wherein in response to that the first configuration information is configuration information which allows the first terminal to switch from the 2T4R type antenna switching to the 1T1R type antenna switching, the each SRS set comprises one SRS resource, and the each SRS resource has one SRS port;

wherein in response to that the first configuration information is configuration information which allows the first terminal to switch from the 2T4R type antenna switching to the 1T2R type antenna switching, the each SRS set comprises two SRS resources, and the each SRS resource has one SRS port;

sending an SRS signal based on the first configuration information.

8. The terminal device according to claim 7, wherein the first configuration information is used to determine one or two SRS resource sets.

9. The terminal device according to claim 7, wherein in the at least one SRS resource set, a usage parameter corresponding to the each SRS resource set is set to a first value, and the first value is used to indicate that the each SRS resource set is used for antenna switching.

10. The terminal device according to claim 7, wherein SRS ports of different SRS resources in a same SRS resource set correspond to different antenna ports.

11. A network device, comprising: a processor and a memory for storing instructions that, when executed by the processor, cause the terminal device to perform a plurality of operations comprising:
receiving first capability information comprising one capability value indicating that a first terminal supports all of 1T1R type antenna switching, 1T2R type antenna switching, and 2T4R type antenna switching;
sending first configuration information to the first terminal, wherein the first configuration information which is configured by the network device according to the first capability information, wherein the first configuration information is configuration information which allows the first terminal to switch from the 2T4R type antenna switching to the 1T2R type antenna switching or configuration information which allows the first terminal to switch from the 2T4R type antenna switching to the 1T1R type antenna switching, and the first configuration information is used to determine at least one Sounding Reference Signal (SRS) resource set, each SRS resource set in the at least one SRS resource set comprises at least one SRS resource, and each SRS resource in the at least one SRS resource has N SRS ports;

wherein in response to that the first configuration information is configuration information which allows the first terminal to switch from the 2T4R type antenna switching to the 1T1R type antenna switching, the each SRS set comprises one SRS resource, and the each SRS resource has one SRS port;

wherein in response to that the first configuration information is configuration information which allows the first terminal to switch from the 2T4R type antenna switching to the 1T2R type antenna switching, the each SRS set comprises two SRS resources, and the each SRS resource has one SRS port;

and receiving an SRS signal sent by the first terminal based on the first configuration information.

12. The network device according to claim 11, wherein the first configuration information is used to determine one or two SRS resource sets.

13. The network device according to claim 11, wherein in the at least one SRS resource set, a usage parameter corresponding to the each SRS resource set is set to a first value, and the first value is used to indicate that the each SRS resource set is used for antenna switching.

14. The network device according to claim 11, wherein in the at least one SRS resource set, resource type parameters corresponding to different SRS resource sets are set to different values.

15. The network device according to claim 14, wherein a value of each of the resource type parameters is one of the following:
- a second value, wherein the second value is used to indicate that the SRS resource set is an aperiodic resource;
- a third value, wherein the third value is used to indicate that the SRS resource set is a semi-persistent resource;
- a fourth value, wherein the fourth value is used to indicate that the SRS resource set is a periodic resource.

* * * * *